United States Patent [19]
Daga et al.
[11] 3,723,285
[45] Mar. 27, 1973

[54] SYSTEM FOR PROTECTING ELECTROLYTIC CELLS AGAINST SHORT CIRCUITS

[75] Inventors: Giorgio Abbate Daga; Lino Cerrocchi; Pietro Fracassi, all of Milan, Italy

[73] Assignee: Montecatini Edison S.p.A.; Guardigli S.p.A., both of Milan, Italy

[22] Filed: Oct. 13, 1970

[21] Appl. No.: 80,433

[30] Foreign Application Priority Data

Oct. 16, 1969 Italy ....................23449 A/69

[52] U.S. Cl. ....................204/228, 204/219, 204/250
[51] Int. Cl. ....................B01k 3/00, C22d 1/04
[58] Field of Search ....................204/99, 219–220, 204/225, 228, 250

[56] References Cited

UNITED STATES PATENTS

| | | | |
|---|---|---|---|
| 3,531,392 | 9/1970 | Schmeiser | 204/225 |
| 3,574,073 | 4/1971 | Ralston, Jr. | 204/225 |
| 3,476,660 | 11/1969 | Selwa | 204/219 X |
| 3,558,454 | 1/1971 | Schafer et al. | 204/99 |
| 3,462,356 | 8/1969 | Wallinder | 204/228 |
| 3,594,300 | 7/1971 | Schafer | 204/225 |

*Primary Examiner*—John H. Mack
*Assistant Examiner*—D. R. Valentine
*Attorney*—Stevens, Davis, Miller & Mosher

[57] ABSTRACT

A device for protecting electrolytic cells against short circuits, having an operational amplifier for each of the ascent bars of said cells, said amplifiers having adjustable gain and being supplied through difference inputs with voltage falls picked up on said bars, circuits being included for compensating the effects due to temperature variations of the bars as well as circuits for the rejection of the common mode voltages due to anodic transversal voltages, the output voltages from said operational amplifiers supplying an averaging circuit for determining the average voltage and a discriminating circuit for determining the highest voltage, the outputs of said averaging and discriminating circuits terminating at a comparator circuit in its turn associated with an alarm and/or control unit.

18 Claims, 3 Drawing Figures

INVENTORS
GIORGIO ABBATE DAGA
LINO CERROCCHI
PIETRO FRACASSI

BY Stevens, Davis, Miller & Mosher
ATTORNEYS

SYSTEM FOR PROTECTING ELECTROLYTIC CELLS AGAINST SHORT CIRCUITS

The present invention relates to a method and relevant electronic device for protection against overloads or short circuits in electrolytic cells, and similar equipment, particularly chlorine-soda amalgam cells. It is known that a chlorine-soda amalgam cell of conventional type consists of a tank at the bottom of which the cathode mercury and the brine flow. A number of frames are placed on the tank, each of which supports a set of anodes.

The intervals between cathodic mercury and anodes — these sunk in the brine — are adjusted by moving the anode-holding frames. To obtain good results said intervals must be very small (a few millimeters). The electric supply, made at low D.C. voltage and high current intensity is passed through the series connection of the cells. Metal (copper) ascent bars lead current to the anodes.

Owing to unevenesses of the amalgam surface or in consequence of different wear of the anodes or other irregularities, overloads or short circuits can occur between one or several anodes and the cathode: a decrease in the cell efficiency or disruptive effects can be the consequence of this.

As generally every ascent bar supplies several anodes with current, the short circuit at an anode produces a per cent rise in the bar rated current, smaller than the rise suffered by the anode rated current. Protection devices — operating alarm and/or control equipment as soon as short circuits occur in electrolytic cells — are already known.

Generally the action of said known devices is simply based on the detection of the current flowing through every anodic ascent bar, each independently of the other. It has been noticed that this method involves some drawbacks due to the fact that the total cell current — and consequently the single currents of the anodic ascents — can remarkably depart from their rated values also under normal service conditions, particularly in consequence of a small load value of the plant. In this case it is possible that no protective action will occur.

Devices having their operation based on the detection of the voltages between several sets of anodes (transverse voltages) are also known; these voltages, which can also be detected under normal operating conditions, increase when short circuits occur. Also these devices involve some drawbacks, particularly as to their poor sensitivity.

An object of this invention is to establish a method for detecting the operating irregularities which concern the distribution of the electrolysis currents and overcurrents in electrolytic cells, said method being able to remove the above specified drawbacks while permitting safe and correct operation, independent of the plant load.

Another object is to provide an electronic device, employing the aforementioned method, which besides offering the advantages thereof, is in itself very accurate, easy to calibrate, insensitive to electric disturbances, has low thermal drift and function based on the detection as well as the processing of the primary quantities, namely the currents.

These objects and advantages, as well as others which will appear evident through the following description, are obtained by a method for protection against overloads in electrolytic cells and similar devices, with a mercury-cathode, particularly chlorine-soda cells, consisting of a tank containing mercury and brine, anode-holding frames being placed on said tank and current conveyed to the anodes through ascent metal bars, this method providing, according to this invention, for the detection of overloads resulting from the discrimination of the bar current having highest intensity for every anode-holding frame, the establishing of an electric quantity as a function of the value of at least one of the other currents and the comparison of said quantity with another homogeneous quantity as a function of said highest intensity current.

To carry out the method of this invention, use is made of an electronic device including difference input operational amplifiers for each of said anodic ascent bars, having a gain control feedback network, these amplifiers being supplied through voltage falls picked up on the bars; the device further includes circuits for compensating the effects due to the temperature variations of the bars and low pass filter circuits for rejecting the disturbances usually present in the plant. The output voltages of these operational amplifiers supply an averaging resistive circuit for determining the average voltage and a diode discriminating circuit for determining the highest voltage in absolute value; the outputs of the averaging and discriminating circuits terminate at a comparator circuit associated, through an amplifier and a time-delay circuit, with an alarm and/or control unit. Finally, the device includes an instrument with change-over input for measuring the output voltages from the operational amplifiers and the average voltage.

This invention will be described in more detail hereinafter with reference to the drawings contained herein wherein equal or equivalent parts are marked with equal references.

FIG. 1 schematically shows a set of anodic ascents connecting the cathode of one chlorine-soda cell to the anodes of a next cell by means of the protection device of the present invention.

Figure 1:
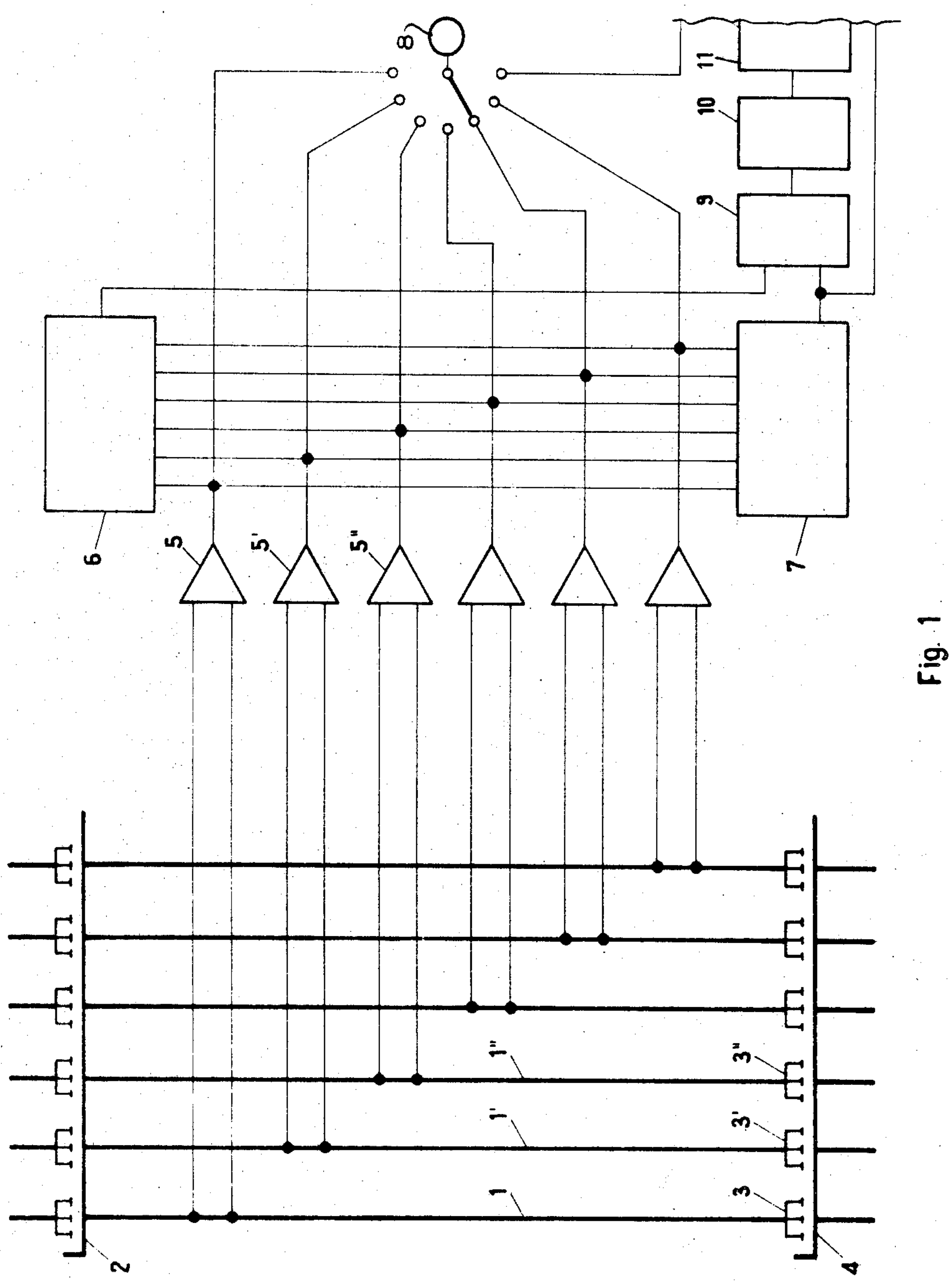

Referring to FIG. 1, anodic ascent bars 1; 1'; 1''; ... (of copper) connect the mercury cathode of cell 2 to the respective sets of anodes 3; 3'; 3''; ... of next cell 4 (in series with cell 2). The voltage falls produced thereby comprise the input voltages of integrated circuit operational amplifiers 5; 5'; 5''; ... with difference inputs. These voltage differences (or falls) are picked off a section of every bar 1; 1'; 1''; ... having a predetermined length.

The outputs of amplifiers 5; 5'; 5''; ... terminate at discriminating circuit 6, averaging circuit 7 and change-over input voltmeter 8 which can be also connected to the output of averaging circuit 7 and has scales for reading the bar currents and the average current. Discriminating circuit 6 and averaging circuit 7 are connected to comparator circuit 9, which is in turn connected, through time-delay circuit 10, to alarm unit 11.

Figure 2:
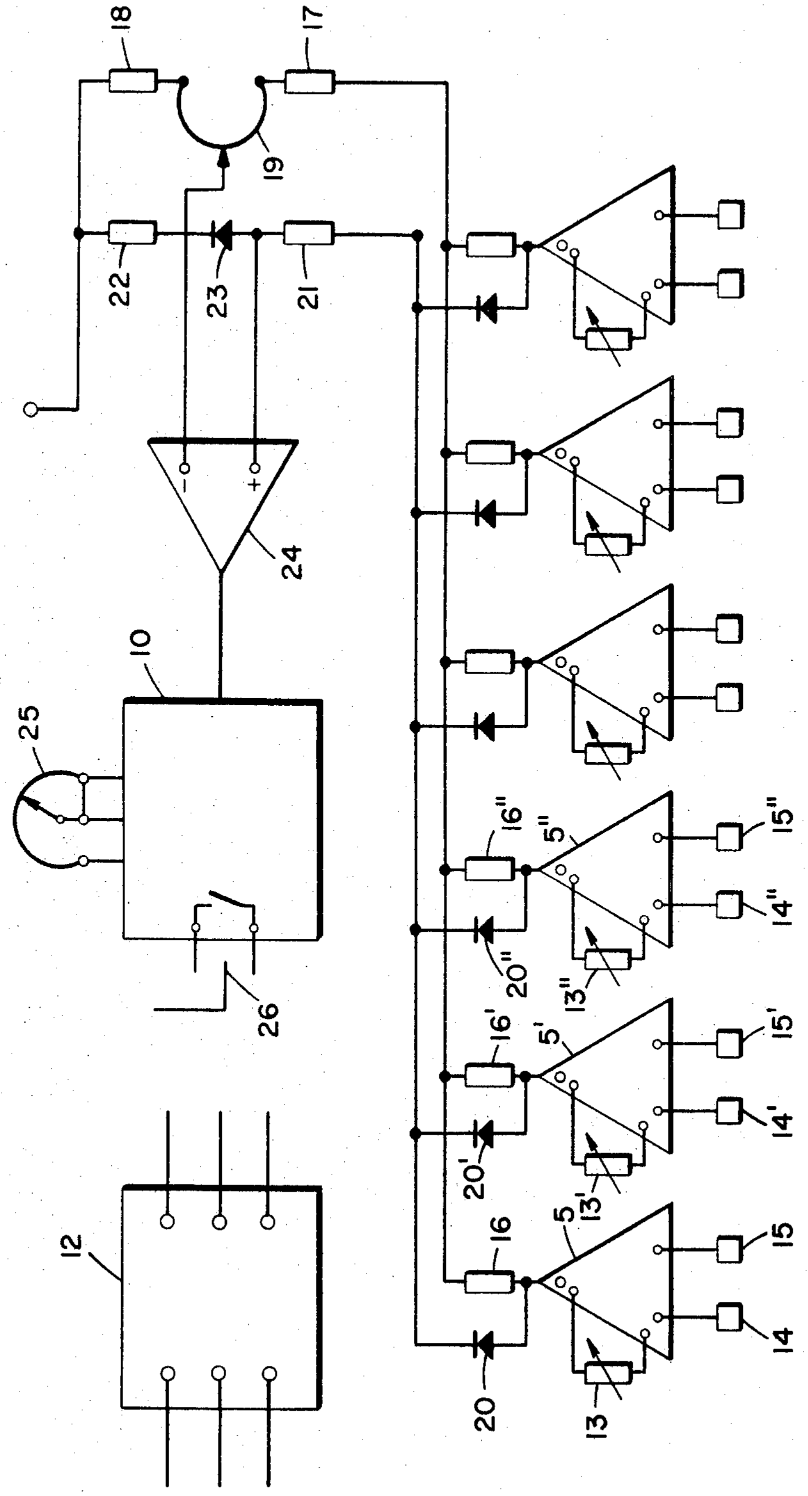
FIG. 2 shows a more detailed block diagram of the protecting device in FIG. 1.

In the block diagram appearing on FIG. 2 — which refers (as does FIG. 1) to a protecting device for a six bar cell element — a stabilized power supply 12 provides the device with the supply voltages through connections which, for the sake of simplicity, were not indicated on the drawing.

The inputs of difference amplifiers 5; 5'; 5'';...— which have gain control elements 13; 13'; 13'';... linked in a feedback network — are connected to bars 1; 1'; 1'';... through thermoelectric elements 14, 15; 14', 15'; 14'', 15'';... directly contacting said bars, with the aim of compensating their temperature variations, as specified afterwards.

These thermoelectric elements 14, 15; 14', 15'; 14'', 15'';... consist of passive elements or networks with a temperature coefficient equal to the coefficient peculiar to the material of which bars 1; 1'; 1'';... are made.

Six voltages, proportional to the currents flowing through respective bars 1; 1'; 1'';... are obtained at the outputs of amplifiers 5; 5'; 5'';...

These output voltages are referred to a common point, as amplifiers 5; 5'; 5'';... are provided with circuits rejecting the common mode voltages, which are present in consequence of the anodic transverse voltages.

By means of resistors 16; 16'; 16'';... (star connected), 17, 18 (this latter being grounded) and potentiometer 19 for the alarm level control, which together comprise the averaging circuit 7 of FIG. 1, a voltage proportional to the average value of the output voltages coming from amplifiers 5; 5'; 5'';... is collected on the brush of potentiometer 19. The level of this proportional voltage is adjustable from a minimum — taken as the average voltage — to a maximum value 75 percent higher than the average voltage.

Discriminating circuit 6 (FIG. 1), comprising the star network of diodes 20; 20'; 20'';..., resistors 21 and 22 and diode 23 — this latter included for compensating any temperature dependent variation of the voltage across diodes 20; 20'; 20'';... when they are conducting — selects the highest value voltage among the six output voltages of amplifiers 5; 5'; 5'';...

A voltage proportional to this highest voltage is present at the common point between resistor 21 and diode 23, having a scale factor the same as that of the average voltage. The voltage proportional to the highest voltage and the voltage picked up from potentiometer 19 are both lead to the input of error amplifier 24, which supplies, at its output, a signal of predetermined polarity when the highest voltage exceeds the average voltage by a value pre-established through potentiometer 19, calibrated in percent of average voltage.

In this case, time-delay circuit 10 is energized which closes contact 26 of alarm unit 11 when a time interval adjustable through potentiometer 25 has elapsed. Temporary irregularities have on the contrary no consequence.

Figure 3:
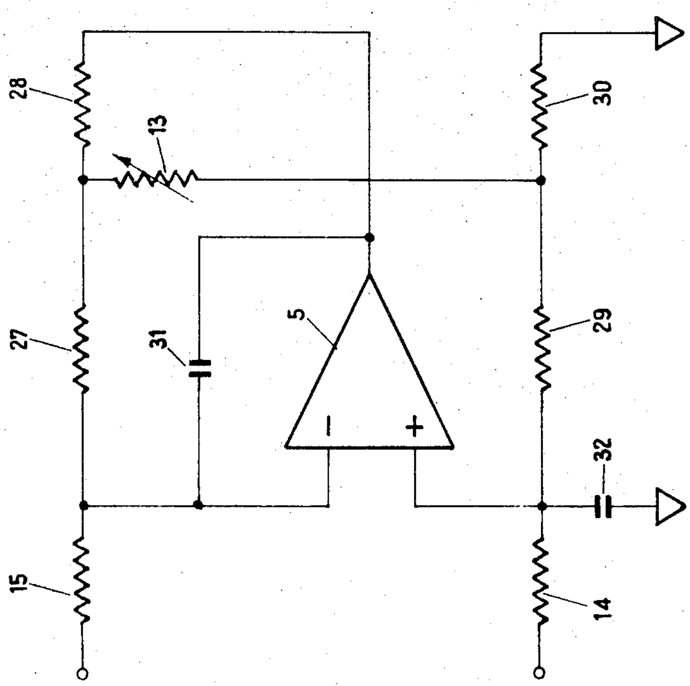
FIG. 3 shows particular control and compensating circuits of the device in FIGS. 1 and 2.

FIG. 3 shows the simplified basic diagram of amplifier 5 (other amplifiers 5'; 5'';... are identical to this one).

Thermoelectric elements 14, 15 consist of two equal copper resistors, having resistance $R_1$, housed in caps to be screwed directly onto bar 1 in such a manner as to have the same bar temperature.

The adjustment of the gain of amplifier 5 is made through element 13 consisting of a potentiometer, with resistance value equal to $KR_2$ (K being the adjustability factor) and connected, in negative feedback, in an H network including four equal resistors 27, 28, 29, 30 (the latter having one side connected to ground) having a resistance value corresponding to $R_2$; low pass filter capacitor 31 is connected between the ends of resistors 27, 28, while another capacitor 32 is connected between the ends of resistors 29, 30. Capacitors 31, 32 filter out casual alternating ripples and voltage flashes present in the utilized signal. In another embodiment the resistors of the H network can be two by two equal, on the opposite sides, instead of being all alike.

Operational amplifier 5 is of the difference type, i.e., the output voltage depends exclusively on the voltage difference available at the input connectors, and not on the level existing at each of them. Moreover the availability of copper resistors 14, 15 makes the amplifier output independent of the temperature variations of bar 1 which, on equal current, cause variations in the voltage fall.

Amplifier 5 also includes other auxiliary circuits, not represented in the drawing for simplicity sake. Particularly, reactive circuits for damping the high frequency self-oscillations of the amplifier and devices for protection against input overvoltages, are available. These latter devices can consist of a couple of diodes in parallel between themselves but reciprocally upside-down, connected between the input connectors of amplifiers 5; these diodes, at normal working voltages, have the sole effect of slightly decreasing the input impedance. Owing to differences of bars 1; 1'; 1'';... it is possible to obtain, under equal current flow through the same, different voltage falls at the connectors of amplifiers 5; 5'; 5'';... The gains of amplifiers 5; 5'; 5'';... are therefore controlled in such a way as to obtain equal output voltages under equal currents through bars 1; 1'; 1'';...

Some data concerning a prototype of the above described device are as follows: voltage fall picked up from the ascent bars = 12 mV; length of the voltage pick up section = 470 mm (bars were cross sectioned 270 × 20 mm and 8,000 A passed through each of them); output voltage of amplifiers 5; 5'; 5'';... = 5 V; thermal drift at the input of amplifiers 5; 5'; 5'';... under 30° C room temperature range = 150$\mu$V; maximum error in the comparison of the highest current with the average current of bars 1; 1'; 1'';... = 1 percent; delay time of delay circuit 10 (to avoid the signalling of transient irregularities) — adjustable from 0 to 15 seconds.

A possible application of this device consists in utilizing the signal, coming as the output from time-delay circuit 10, to automatically control the lift of the anode-holding frames.

A modification of the above consists in providing the plant with a device per every cell, instead of a device per every anode-holding frame.

Further modifications — equivalent both from the structural and functional viewpoint — can be brought, in addition to the specified ones, to this invention without going outside its scope.

What is claimed is:

1. A device for protection against short circuits in electrolytic cells, comprising: a plurality of anodes operatively associated with said cells; ascent bars connected to said anodes and carrying current therein; at least one operational amplifier having adjustable gain operatively associated with each of said ascent bars; difference input means supplying said amplifiers with voltage falls picked up on said bars, said difference input means including symmetrically connected means compensating the effects of temperature variations of said bars and means rejecting common mode voltages due to anodic transversal voltages; means carrying output voltages from said operational amplifiers to averaging circuit means determining the average voltage and to discriminating circuit means determining the highest voltage obtained from said difference input means; and means carrying the outputs of said averaging and discriminating circuit means to a comparator circuit operatively associated with control means.

2. A device according to claim 1, wherein each of said operational amplifiers includes an H-connected resistive network in negative feedback arrangement for gain control, said H-connected network including a potentiometer in its middle branch.

3. A device according to claim 2, wherein opposite branches of the remaining four branches of said H network comprise resistors of equal value.

4. A device according to claim 1, wherein said compensating means includes passive network means having a coefficient of temperature substantially equal to the a coefficient of temperature of the material of which said bars are constructed, said compensating means contacting said bars and being series connected to input connectors of said operational amplifiers.

5. A device according to claim 1, wherein said averaging circuit comprises a star network of resistors connected to the outputs of said operational amplifiers and the device further includes a potentiometer means controlling an alarm level, said averaging means being connected to the input of said potentiometer means, and said potentiometer means being calibrated in percent of average voltage.

6. A device according to claim 5, wherein said potentiometer means is connected to at least an input connector of an error amplifier, at least another input connector of which is supplied with said highest voltage, the error amplifier being triggered when the difference between these input voltages exceeds a value depending on the voltage supplied by said potentiometer means.

7. A device according to claim 1, wherein said discriminating circuit comprises a star network of diodes connected in series to the outputs of said operational amplifiers and the device further includes diode means for compensating temperature variations of the potential across said diodes in their conductive state.

8. A device according to claim 1, further comprising time-delay circuit means for adjusting delay time and for preventing transmission of transient irregularities connected between said comparator circuit and said control means, said time delay circuit including a potentiometer for regulating the delay time.

9. A device according to claim 1, further including a voltmeter having a plurality of operative positions, said voltmeter being connected at the outputs of said operational amplifiers and said averaging circuit, said voltmeter being operative in one state to read the currents of said bars and in a second operative state to read average current.

10. A device according to claim 2, wherein each of said operational amplifiers further includes a low-pass filter connected in negative feed-back arrangement.

11. A device according to claim 1, wherein said compensating means includes passive network means symmetrically connected at the inputs of said operational amplifiers.

12. A device according to claim 11, wherein said passive network means comprises thermoelectric elements, and wherein each of said bars is symmetrically provided with two of said thermoelectric elements.

13. A device according to claim 12, wherein said thermoelectric elements comprise resistors housed in caps screwed directly onto said bars, said resistors being series connected to input connectors of said operational amplifiers.

14. A method for protecting against overloads in electrolytic cells, comprising the steps of: connecting a plurality of anodes with at least one cathode; measuring voltage drops across predetermined portions of the connecting links between said anodes and said at least one cathode; averaging said voltage drops; discriminating said voltage drops to obtain the highest value voltage drop; and obtaining a difference voltage between said highest value voltage drop and said average voltage drop.

15. A method according to claim 14, comprising the further step of amplifying said voltage drops; and wherein said averaging step includes the further steps of obtaining a voltage proportional to the average value of said amplified voltage drops and adjusting said proportional voltage in a range from a value substantially equal to said average value to a value approximately 75 percent higher than said average value.

16. A method according to claim 14 wherein said step of obtaining a difference voltage includes the further step of obtaining a signal of predetermined polarity when said highest value voltage drop exceeds said average voltage drop by a predetermined value which depends on said average voltage drop.

17. A method according to claim 14, wherein said measuring step includes the step of rejecting common mode voltages in said voltage drops.

18. A device for protecting electrolytic cells against short circuits, comprising:

a plurality of ascent bars connected to the anodes of said cells;

a plurality of operational amplifiers having adjustable gain;

difference input means connecting said operation amplifiers to respective ones of said ascent bars and supplying said amplifiers with voltage falls picked up on said bars, said difference input means including compensating means for compensating the effects of temperature variations of said bars and means rejecting common mode voltages due to anodic transversal voltages;

averaging circuit means connected to the outputs of said operational amplifiers for determining the average output voltage of said amplifiers;

discriminating circuit means connected to the outputs of said operational amplifiers for determining the highest voltage obtained from said difference input means;

comparator means connected to the outputs of said averaging means and discriminating means for comparing the outputs of the averaging and discriminating means; and control means connected to the output of said comparator means, said control means being activated by the output of said comparator means.

* * * * *